Patented Mar. 24, 1931

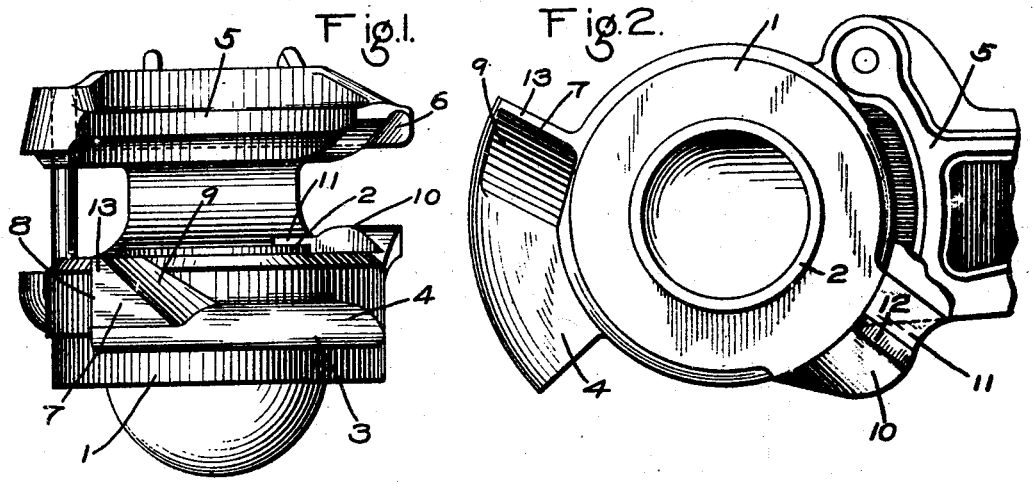
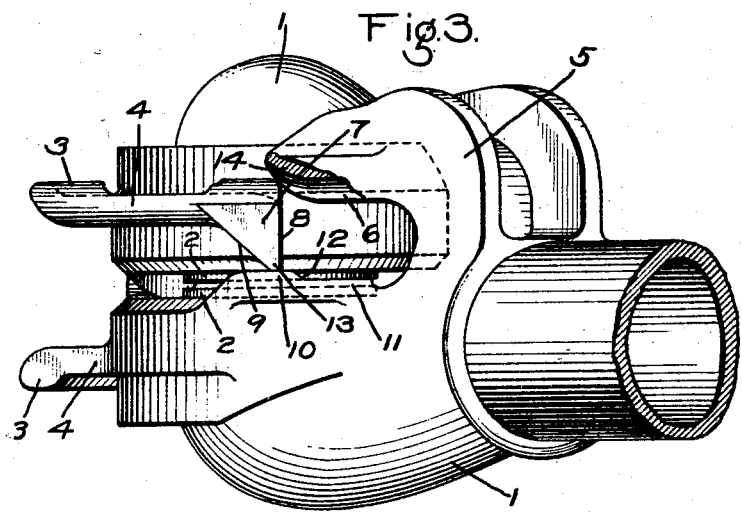
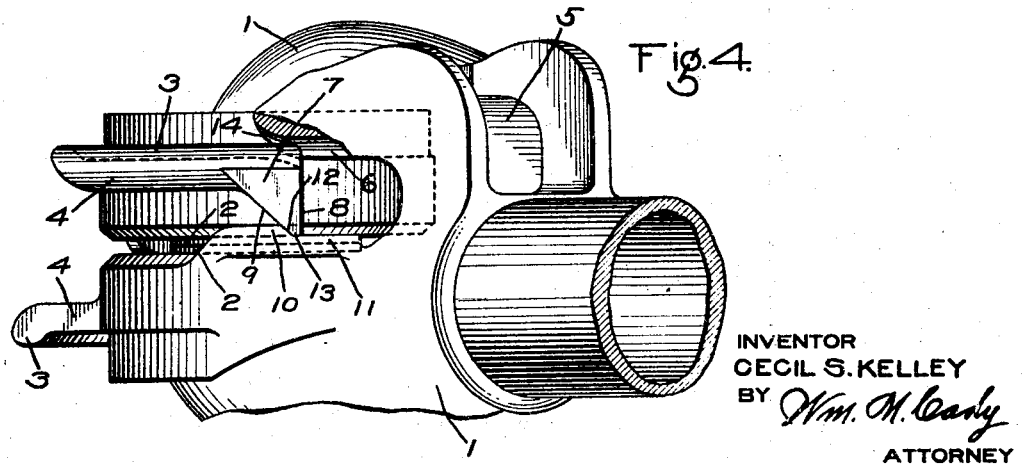
INVENTOR
CECIL S. KELLEY
ATTORNEY

1,797,423

UNITED STATES PATENT OFFICE

CECIL S. KELLEY, OF EAST McKEESPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA

HOSE COUPLING

Application filed September 26, 1927. Serial No. 221,923.

This invention relates to hose couplings of the type employed to connect the ends of a train pipe between cars of a train.

The railway type of hand operated hose coupling is provided with a lateral opening having a gasket, an arcuate rib, and an angular arm having a groove, in which the rib of a counterpart coupling is adapted to engage upon relative rotative movement of the coupling heads.

It sometimes occurs that in coupling, the heads may be brought together in such a way that the gaskets of the counterpart coupling heads engage before they are in axial alinement and then as the heads are moved into alinement, the gaskets are distorted and remain so in the final coupled position, so that the lateral opening area is reduced by the overlapping of the gaskets and leakage is liable to occur, by reason of the distortion of the gaskets.

The principal object of my invention is to provide a hose coupling head of the above type, in which means are provided for preventing engagement of the gaskets of counterpart coupling heads until by relative rotative movement of the heads, the gaskets are brought into axial alinement, through engagement of the locking rib of one head with the groove of the other head.

In the accompanying drawing: Fig. 1 is an end view of a hose coupling embodying my invention; Fig. 2 a face view thereof; Fig. 3 a view of two coupling heads in position before the rib of one head engages the groove of the other head; and Fig. 4 a view of two coupling heads in position after the rib of one head engages the groove of the other head.

The coupling head comprises a body 1 having a lateral opening provided with the usual gasket 2 adapted to engage the corresponding gasket of a counterpart coupling when the couplings are interlocked.

For locking the couplings together, the coupling head is provided with an arcuate rib 3 which is formed on a projecting flange 4 at one side of the lateral opening and concentric therewith.

On the other side of the opening there is an angular arm 5 on the inner face of which is formed an arcuate groove 6 concentric with the lateral opening and adapted to receive the rib 3 when counterpart couplings are placed together, with the lateral openings in alinement, and are relatively rotated.

According to my invention, there is provided at one end of the flange 4 opposite to the rib 3, a lug 7 having a vertical face 8 and an inclined face 9. At the opposite side of the lateral opening, the coupling is provided with a raised portion 10 and a raised portion 11, the face of which is at a lower level than the face of the portion 10, the faces being connected by an inclined face 12. The inclined face 12 is disposed substantially on the same diameter line, passing through the axis of the lateral opening, as the edge 13 of the lug 7.

When counterpart coupling heads are applied together, with the lateral openings in alinement, the edge 13 of one coupling head will engage the raised portion 10 of the counterpart coupling head, in any relative angular position at which the heads may be applied, as shown in Fig. 3. As will be clearly apparent, the engagement of the edge 13 of one head upon the raised portion 10 of the other head prevents the counterpart gaskets 2 from engaging. After a sufficient relative rotation of the coupling heads to cause the rib 3 of one head to enter into the groove 6 of the other head, the edge 13 is moved off the raised portion 10 to the raised portion 11.

This movement permits the movement of the gaskets 2 into engagement, but during the movement, the rib 3 of one head is in engagement with the groove 6 of the other head, so that the gaskets 2 are guided in axial alinement, while the gaskets are being brought into engagement. Further relative rotative movement of the coupling heads causes the clamping together of the heads and the compression of the gaskets 2 so as to effect a leak tight joint at the gaskets.

At the same time, the lugs 7 and the raised portions 10 are so disposed that the pulling apart of the heads after being fully coupled is not hindered and such pulling apart can take place in the same way as in the usual coupling of this type.

Preferably the entering portion of the groove 6 is flared outwardly, as shown at 14, to facilitate the initial engagement of the rib 3 in the groove 6.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A pipe coupling head having a lateral opening provided with a gasket, means associated with the coupling head for interlocking counterpart coupling heads upon relative rotative movement of the heads, and means for preventing engagement of the counterpart gaskets with each other during the initial rotative movement of the heads and until the interlocking action is initiated.

2. The combination with two hose coupling heads each having a lateral opening provided with a gasket, a curved rib and a curved groove, the rib of one head being adapted to engage the groove of the other head upon relative rotative movement of the heads, a lug and a raised portion carried by each head, the lug of one head being adapted to engage the raised portion of the other end during the initial rotative movement of said heads, to thereby initially prevent engagement of the gaskets with each other, said lugs moving out of engagement with said raised portions upon engagement of a rib of one head with the groove of the other head.

In testimony whereof I have hereunto set my hand.

CECIL S. KELLEY.